C. BURNETT.
HOG FEEDER.
APPLICATION FILED JUNE 14, 1919.

1,344,789.

Patented June 29, 1920.
2 SHEETS—SHEET 1.

Inventor
Charley Burnett.

Witness
H. Lundell

By
C. C. Shepherd, Attorney

C. BURNETT.
HOG FEEDER.
APPLICATION FILED JUNE 14, 1919.

1,344,789.

Patented June 29, 1920.
2 SHEETS—SHEET 2.

Witness
A. Sundell

Inventor
Charley Burnett.

By
C. C. Shepherd
Attorney

UNITED STATES PATENT OFFICE.

CHARLEY BURNETT, OF WASHINGTON COURT-HOUSE, OHIO, ASSIGNOR OF ONE-FOURTH TO HARVEY GRANT COFFMAN AND ONE-FOURTH TO LEWIS CLAYBORN COFFMAN, BOTH OF WASHINGTON COURT-HOUSE, OHIO.

HOG-FEEDER.

1,344,789.      Specification of Letters Patent.      Patented June 29, 1920.

Application filed June 14, 1919. Serial No. 304,199.

*To all whom it may concern:*

Be it known that I, CHARLEY BURNETT, a citizen of the United States, residing at Washington Court-House, in the county of Fayette and State of Ohio, have invented certain new and useful Improvements in Hog-Feeders, of which the following is a specification.

This invention relates to hog feeders, and has for its primary object to provide a hog feeder characterized by its general simplicity of construction, ease of operation and by improved means for preventing the feeding matter placed within the hopper of the feeder from being wasted by the actions of feeding animals, by chickens or other fowls or through the action of wind or the other elements.

Another object of the invention resides in a hog feeder wherein is embodied an improved hopper structure, which latter consists of a substantially closed body having an opening formed in the front thereof, the latter being substantially covered by a pivoted door member with which is also pivotally associated a projecting lid, the latter being adapted to overlie a stationary projection formed in the hopper, said lid being so arranged that the animals when feeding will elevate the same and in this manner the contents of said hopper will be rendered accessible. Another object resides in locating the lid or lids in such relation with respect to the door member and the fixed abutment so that said lids will normally gravitate to a closed position in order that the contents of the hopper will be prevented from escaping from the latter when the feeder is not being actively employed, the lid arrangement being further such that the interior of the hopper will be rendered inaccessible to animals or fowls which are not intended to feed from said hopper.

A further object of the invention resides in constructing the pivoted door member so that the latter may be adjustably positioned in an inclined direction within the hopper so that the quantity of the feed flowing from the storing space of said hopper into the feeding trough thereof may be suitably regulated in accordance with the character of food utilized.

Other objects of the invention reside in a feeder of the aforesaid character which is of an exceedingly durable construction, capable of being readily transported from place to place.

With these and other objects in view, as will appear as the description proceeds, the invention accordingly consists in the novel features of construction, combination of elements and arrangement of parts, hereinafter to be fully described and to have the scope thereof pointed out in the appended claims.

In the accompanying drawing, forming a part of the present specification, and wherein similar characters of reference denote like and corresponding parts:

Figure 1:
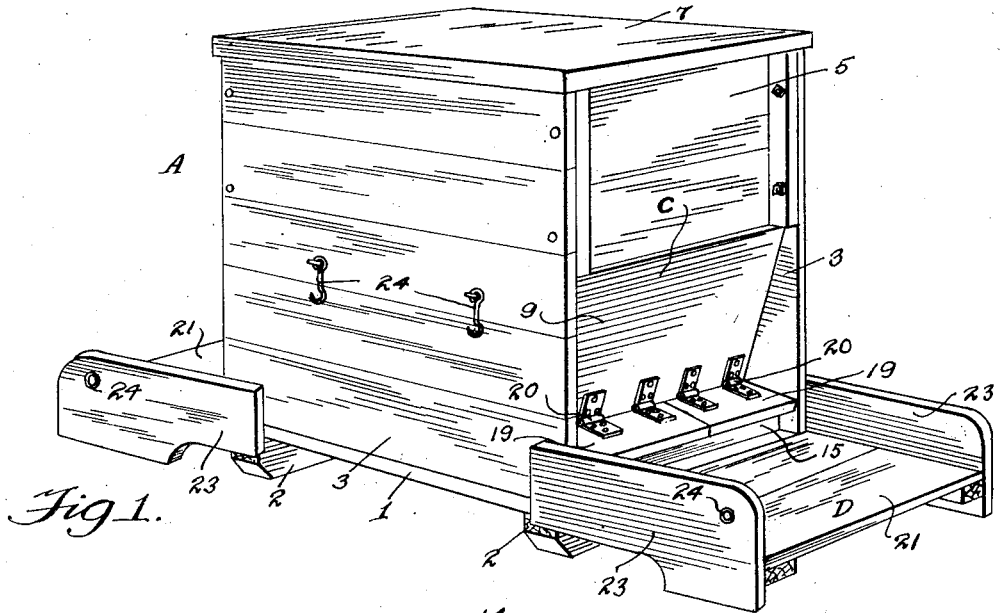
Figure 1 is a perspective view of a hog feeder constructed in accordance with the principles of the invention.

Referring more particularly to the structural details of the invention, use is made of a hog feeder A wherein is embodied a hopper or magazine B. The latter in this instance is of duplex construction or, in other words, is so formed as to permit of animals feeding on both sides thereof, so that the capacity of the feeder may be materially increased without a corresponding increase in the space occupied. However, it will be appreciated that the feeder may be of the so called "single type" variety if found expedient. Obviously, best results can be obtained from the duplex type and for this reason the same will be specifically set forth in the following description.

In this instance, the hopper B is formed to consist of a base 1, which may be formed from any desired material or of any suitable proportions, and this base may be mounted upon suitable transporting frames which have been shown in the form of spaced parallel runners 2, the latter serving to elevate the base and to facilitate the transportation of the feeder as a whole. Extending perpendicularly in the upper direction from the base 1 are spaced side walls 3, and a spaced central dividing partition 4. The side walls 3 are connected adjacent to their upper and outer edges by means of longitudinally extending front walls 5, which terminate a considerable distance above the base 1 so as to provide feeding openings 6. A removable cover 7 may be placed upon the walls 3 and 5 so as to inclose the separate magazines of the feeder and to permit of the convenient insertion of the feed matter 8 therein.

Figure 2:
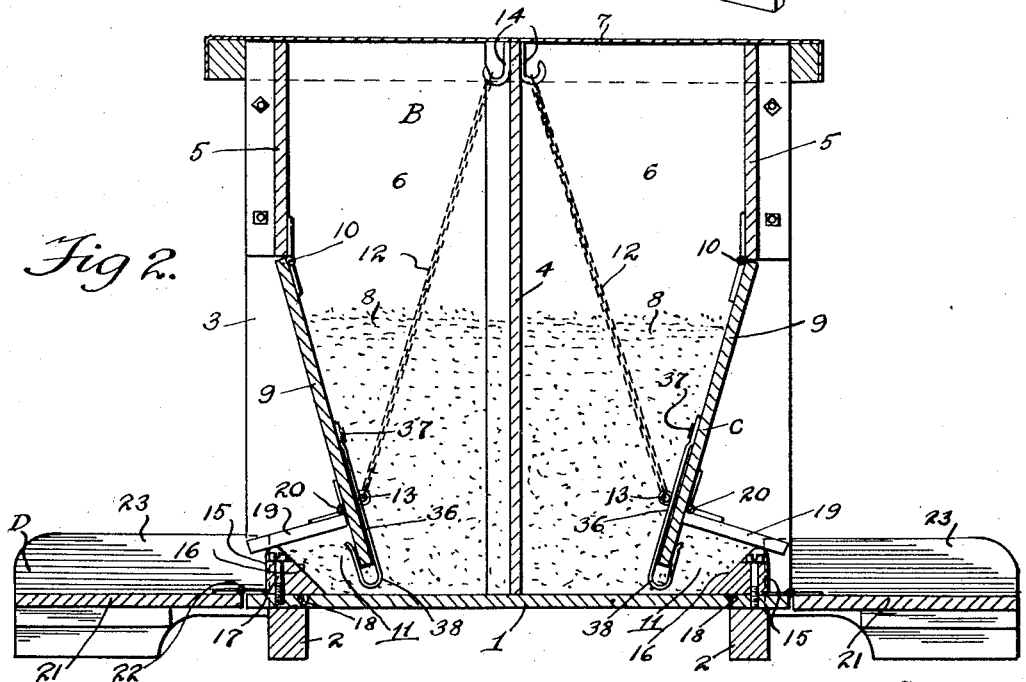
Fig. 2 is a vertical transverse sectional view taken through the feeder.
Figure 3:
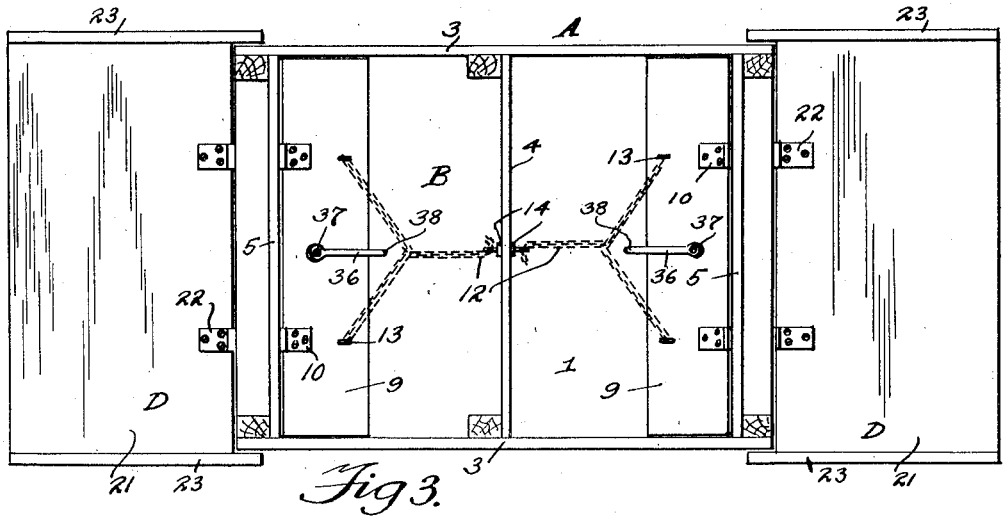
Fig. 3 is a plan view of the feeder, the top having been omitted to disclose the underlying structure, and, Fig. 4 is a fragmentary perspective view of the feeding trough structure.
Figure 4:
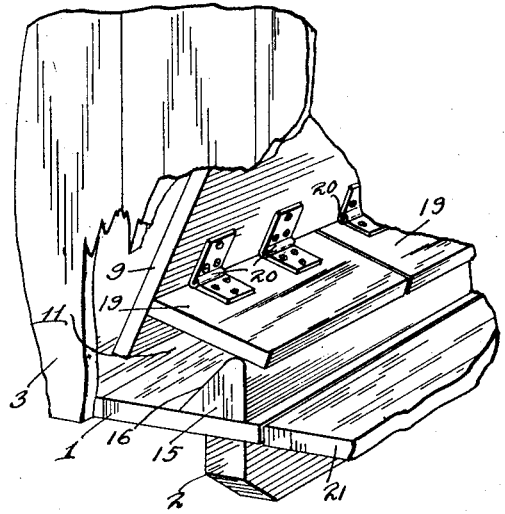

In order to cover the opening 6 and yet to permit the contents of the magazines to be rendered easily accessible to the hogs, use is made of an improved door structure C. This structure in the form illustrated in Figs. 1 to 3 consists of a pair of door members 9, the latter being hinged at their upper ends as shown at 10 to the lower edges of the walls 5, and in this manner are adapted to hang downwardly so as to substantially cover the feeding openings. In order to regulate the flow of the feeding material 8 from the upper or storage portions of the magazines into the underlying feeding troughs 11, use is made of a plurality of flexible elements 12, the latter having their lower ends suitably secured as at 13 to the lower portions of the door members 9 and have their upper extremities adjustably connected with a plurality of fixed hook members 14. It will be manifest that by changing the upper links of the elements 12 with respect to the members 14 that the angularity of the door members 9 may be readily governed, or in other words, the distance between the partition 4 and the lower ends of said door members may be suitably varied so as to control the quantity of matter passing into the troughs 11. This adjustment is highly desirable in accommodating the feeder to the different kinds of feeding materials utilized in the feeding of hogs.

Located upon the base 1 and at a point substantially adjacent the outer longitudinal edges thereof is a pair of longitudinally extending abutments 15, which are provided, for a reason to be hereinafter assigned, with downwardly sloping walls 16. And these abutments 15 are adjustable transversely of the base 1 by the provision of pins 17, which pass through vertical openings formed in the abutments and through alining openings 18 formed in the base 1. In view of the fact that the openings 18 are located in transversely spaced relation, it will be obvious that the abutments 15 may be moved to suitable transverse positions upon the base 1 and secured in these adjusted positions by dropping the pin 17 through the registering openings 18. This adjustment is employed in order that the relative distance between the lower end of the door members 9 and the abutments 15 may remain substantially uniform.

Adapted to bridge the gap between the members 9 and the abutments 15 is a plurality of lids 19. These lids have their inner extremities hinged as at 20 to the lower ends of the members 9, and their opposite ends are extended so as to overlie the sloping walls 16 of the abutments 15. By virtue of this construction, an animal may elevate the lids 19 through its normal rotating tendency and in this manner gain access to the contents of the troughs 11. Said lids are preferably formed in pairs so that but a properly sized feeding opening will be presented to the individual animals. By forming the lids in pairs, exceedingly enlarged openings are precluded so that waste of the feeding material will be accordingly minimized. The packed material 8 behind the door members 9 serves to prevent undue inward swinging movement on part of the door members, and in this way the lids 19 are prevented from falling in behind the abutments 15 so that their operation is thus prevented from being hindered.

A folding step structure D is provided in conjunction with the hopper B for the purpose of providing an approach or entrance to the feeder. This step structure consists of a pair of frames 21, which are hinged as at 22 to the base 1, and are provided with side extensions 23. When the frames 21 assume active positions, the same are substantially parallel and on the same plane with the base 1, and in this location said frames serve to prevent the feeding matter escaping from the troughs 11 from being scattered over adjacent premises. The extensions 23 are also elevated so as to extend above the frames 21 and in this manner serve to prevent the scattering of the feeding material. When not in use, the frames 21 are folded upwardly so that the same will lie substantially parallel with the walls 3 and 5 of the feeder, and the frames are retained in this position by means of hook and eye elements 24, which when interengaged will prevent oscillating movement on part of the frames. When thus collapsed, the feeder will occupy but a minimum of space and will thus be in condition to be readily transported.

In view of the foregoing description, it is believed that the construction and operation of the invention will be clearly understood. Through the provision of the door structure described, substantially three coöperative features are embodied therein, the first of which is the adjustment for governing the flow of the feeding material, secondly, the hinged lid structure which normally serves to protect the feeding material, and, thirdly, the fixed abutments against which the lids rest, and which abutments are so located with respect to the lids that the latter must be elevated in order to open the troughs 11. From this it will be gathered that the feeder will be very economical in operation and that the element of waste hitherto largely involved will be greatly minimized. This factor of waste is further reduced through the provision of the folding step structure which serves to confine whatever matter may escape from the troughs and prevents the same from falling upon the surrounding ground. To agitate the feeding matter and to promote its flow, the rear face of the door member 9 is provided with an agitator 36, which has its upper end pivoted as at 37, said agitator extends downwardly in parallelism with the door member and is provided with a forwardly directed actuating portion 38. In operation, the rooting of the animal within the trough 11 results in the lateral oscillation of said agitator, so that the flow of the feeding material from the magazine into said trough will be oscillated.

In view of the above, it is believed that the operation and construction of the present invention will be readily perceived by those versed in the art, and therefore a more extended explanation has been accordingly omitted.

I claim.

1. A hog feeder comprising a hopper formed to include a base having perpendicular side walls connected therewith, the front wall being provided with an opening, an angularly disposed door member hinged to said front wall and disposed to substantially close said opening, an upwardly projecting abutment positioned upon said base, and a lid hinged at one edge to the lower end of said member and having its opposite edge disposed to overlie said abutment.

2. A hog feeder comprising a hopper formed to include a base, perpendicular side and back walls connected with said base, a swinging front wall hinged at its upper end and adapted to substantially cover the front of said hopper, means for varying the angularity of said front wall to govern the distance between the lower edge of the same and said back wall, a substantially fixed projection carried upon said base, and a pivoted lid connected with the lower portion of said swinging front wall and adapted to overlie said projection.

3. A hog feeder comprising a hopper formed to include a base, side walls extending perpendicularly from said base, a partition centrally situated with respect to said base and extending between said side walls, a pair of pivotally mounted front wall members carried by said hopper, flexible elements situated to connect said front walls with a fixed portion of said hopper for controlling the relative distances between the lower portions of said front wall members and said partition, the lower edges of said members being spaced from said base to provide feed exits, fixed abutments carried by said base and spaced from the lower edges of said members to provide troughs, and a plurality of lid elements movably connected with the lower portions of said members and disposed to overlie said abutments and to thereby be capable of covering said troughs, said lid elements being capable of uncovering said troughs upon the application of upwardly directed pressures.

4. A hog feeder comprising a hopper formed to include a base, perpendicular back and side walls connected with said base, a front wall member hingedly mounted at its upper edge and disposed to terminate in spaced relationship from said base whereby a grain exit is provided, adjustable means for retaining said front wall member in adjusted positions with respect to said back wall whereby the width of said grain exit may be regulated, an adjustable abutment carried by said base and movable to maintain a substantially uniform distance between the same and the lower edge of said front wall member, and a plurality of lid elements hinged to the lower portions of said front wall member and capable of gravitating into engagement with said abutment to normally cover said grain exit, said lid elements being only capable of opening upon the application of upwardly directed pressures.

5. A hog trough comprising a hopper formed to include a base, side walls extending vertically upward from said base, a partition centrally situated with respect to said base and side walls and disposed between the latter, door members situated to the front of said hopper and having their upper edges pivotally mounted, whereby the front wall members may swing inwardly of said hopper, means for retaining said members in their inwardly swung positions and to control the angularity thereof, adjustable abutments having sloping side walls carried by said base, and lid elements hingedly carried by the lower portions of said front wall members and disposed to gravitate into engagement with said abutments and to extend over the sloping side walls of the latter.

In testimony whereof I affix my signature.

CHARLEY BURNETT.

Witnesses:
H. G. COFFMAN,
L. C. COFFMAN.